United States Patent
Stoecker et al.

(12) United States Patent (10) Patent No.: US 7,208,898 B2
(45) Date of Patent: Apr. 24, 2007

(54) NEAR TIME-OPTIMAL JERK TRAJECTORY FOR POSITIONING A CONTROL OBJECT

(75) Inventors: Chad Andrew Stoecker, Downers Grove, IL (US); Eduardo Akira Misawa, Stillwater, OK (US); Clyde Everett Goodner, III, Lakeville, MN (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 13 days.

(21) Appl. No.: 11/158,438

(22) Filed: Jun. 22, 2005

(65) Prior Publication Data

US 2006/0290314 A1 Dec. 28, 2006

(51) Int. Cl.
G05B 13/00 (2006.01)
G11B 5/596 (2006.01)
G11B 21/02 (2006.01)

(52) U.S. Cl. .............. 318/561; 318/560; 318/567; 318/443; 360/78.06; 360/78.08; 360/78.04

(58) Field of Classification Search ............. None
See application file for complete search history.

(56) References Cited

U.S. PATENT DOCUMENTS

| | | | |
|---|---|---|---|
| 5,229,896 A | 7/1993 | Tohyama et al. | |
| 5,291,110 A * | 3/1994 | Andrews et al. | 318/560 |
| 5,668,680 A | 9/1997 | Tremaine | |
| 5,901,009 A | 5/1999 | Sri-Jayantha et al. | |
| 6,002,971 A | 12/1999 | Lucas | |
| 6,011,373 A | 1/2000 | McConnell et al. | |
| 6,114,825 A | 9/2000 | Katz | |
| 6,148,240 A | 11/2000 | Wang et al. | |
| 6,256,163 B1 | 7/2001 | Schmidt et al. | |
| 6,294,891 B1 | 9/2001 | McConnell et al. | |
| 6,320,345 B1 | 11/2001 | Yuan et al. | |
| 6,560,059 B1 | 5/2003 | Hsin et al. | |
| 6,801,384 B2 * | 10/2004 | Chu et al. | 360/78.07 |
| 6,825,633 B2 | 11/2004 | Hamann et al. | |
| 6,850,386 B2 * | 2/2005 | Kovinskaya et al. | 360/78.06 |
| 2001/0006438 A1 | 7/2001 | Nakagawa et al. | |

(Continued)

OTHER PUBLICATIONS

Y. Mizoshita et al., "Vibration Minimized Access Control For Disk Drives," IEEE Transactions On Magnetics, IEEE (Japan), vol. 32 (No. 3), p. 1793-1798, (Oct. 5, 1995).

*Primary Examiner*—Lincoln Donovan
*Assistant Examiner*—Eduardo Colon Santana
(74) *Attorney, Agent, or Firm*—Fellers, Snider, et al.

(57) ABSTRACT

Method and apparatus for control object manipulation from an initial position to a final position. A jerk control profile describes a near time-optimal jerk trajectory for the control object and includes a sequence of first, second and third sinusoidal pulses of respectively alternating polarity and common absolute magnitude. The area of the second pulse is nominally equal to the combined area of the first and third pulses, and the pulses are preferably symmetric about the respective maximum pulse values. Associated control profiles (control voltage, current, velocity, displacement, etc.) are derived from the jerk control profile. For longer seeks, constant, non-zero jerk segments are inserted into the profile between the pulses, during which control voltage is maintained near saturation. The control object preferably comprises a transducer in a data storage device and the jerk control profile is stored in a memory location of the device.

18 Claims, 8 Drawing Sheets

U.S. PATENT DOCUMENTS

| | | |
|---|---|---|
| 2004/0135534 A1* | 7/2004 | Cullen ........................ 318/609 |
| 2004/0225382 A1 | 11/2004 | Brown et al. |
| 2004/0233569 A1 | 11/2004 | Chung |
| 2004/0249509 A1 | 12/2004 | Rogers et al. |
| 2005/0094309 A1* | 5/2005 | Lee ........................ 360/78.06 |
| 2006/0158773 A1* | 7/2006 | Semba et al. ............ 360/78.06 |
| 2006/0170382 A1* | 8/2006 | Yang et al. ................ 318/114 |

* cited by examiner

NEAR TIME-OPTIMAL JERK TRAJECTORY FOR POSITIONING A CONTROL OBJECT

STATEMENT REGARDING FEDERALLY SPONSORED RESEARCH OR DEVELOPMENT

This invention was made with government support under Grant No. CMS-9978748 awarded by the National Science Foundation. The government has certain rights in the invention.

FIELD OF THE INVENTION

The claimed invention relates generally to the field of control systems and more particularly, but not by way of limitation, to an apparatus and method for moving a control object from an initial position to a final position using a near time-optimal jerk trajectory.

BACKGROUND

Control systems are used to move a variety of control objects from an initial position to a final position. For example, data storage devices commonly utilize a closed loop servo control system to position a data transducer adjacent individual tracks on a data storage medium.

A well known servo control approach is Pontryagin's Time-Optimal Control Solution, which generally operates to change the system state in minimum time while at all times using all available system power. This approach is sometimes also referred to as Bang-Bang Control.

While time-optimal, some real world applications can limit the viability of this approach due to the presence of variable or unquantifiable system resonances. More particularly, abrupt changes in jerk (change in acceleration with respect to time) can serve as a broad spectrum excitation of the system, resulting in unacceptably long settle times at the final position.

Accordingly, there is a continual need for improvements in the manner in which control trajectories are formulated as part of a control solution, such as but not limited to the controlled movement of a transducer in a data storage device.

SUMMARY OF THE INVENTION

Preferred embodiments of the present invention are generally directed to an apparatus and method for moving a control object from an initial position to a final position, such as a transducer in a data storage device.

A jerk control profile is provided to describe a near time-optimal jerk trajectory for the control object. The jerk control profile comprises a sequence of first, second and third sinusoidal pulses of respectively alternating polarity and common absolute magnitude. The area of the second pulse is nominally equal to the combined area of the first and third pulses, and the pulses are preferably symmetric about the respective maximum pulse values.

Associated control profiles (control voltage, current, velocity, displacement, etc.) are derived from the jerk control profile. For longer seeks, constant, non-zero jerk segments are inserted into the profile between the pulses, during which control voltage is maintained near saturation.

These and various other features and advantages which characterize the claimed invention will become apparent upon reading the following detailed description and upon reviewing the associated drawings.

DETAILED DESCRIPTION

Figure 1:
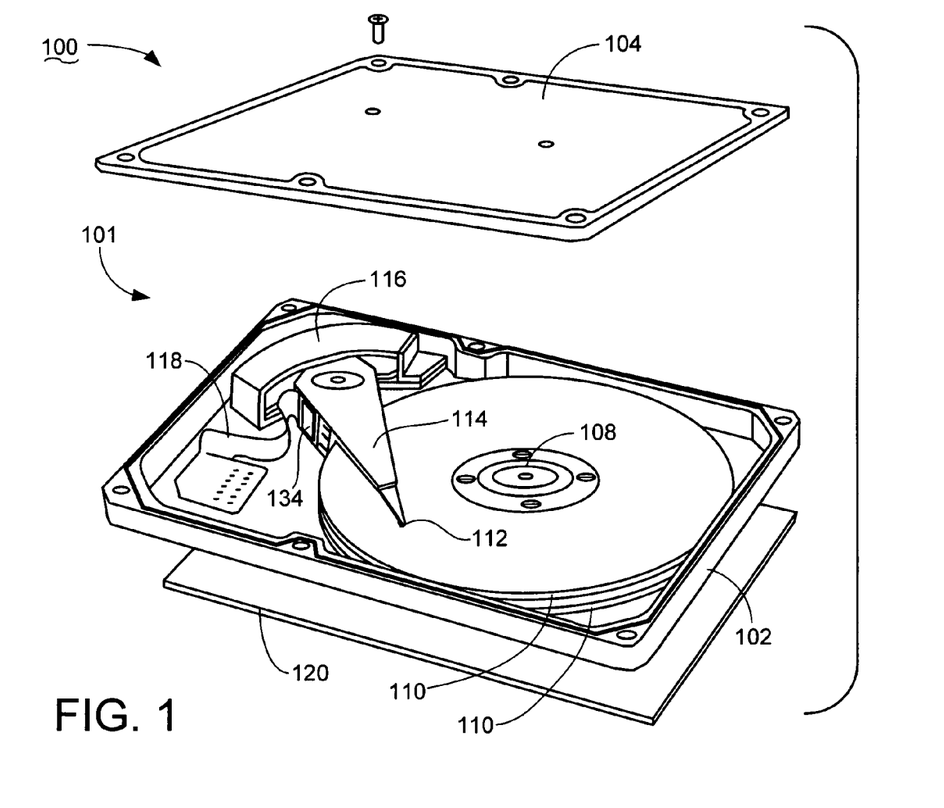
FIG. 1 is an exploded view of a data storage device constructed and operated in accordance with preferred embodiments of the present invention.

To illustrate an exemplary environment in which presently preferred embodiments of the present invention can be advantageously practiced, FIG. 1 shows an exploded view of a data storage device 100. The device 100 is preferably characterized as a small form factor disc drive used to store and retrieve user data in a battery-operated, handheld mobile product such as a notebook computer or a digital camera, but such is not limiting to the scope of the claimed subject matter.

The device 100 includes a rigid, environmentally controlled housing 101 formed from a base deck 102 and a top cover 104. A spindle motor 108 is mounted within the housing 101 to rotate a number of data storage media 110 (in this case, two) at a relatively high speed.

Data are stored on the media 110 in an array of concentric tracks (not shown), having a nominal radial density of about 100K tracks/inch (in). The tracks are accessed by a corresponding array of data transducing heads 112 (transducers). The heads 112 are supported by an actuator 114 and moved across the media surfaces by application of current to a voice coil motor, VCM 116. A flex circuit assembly 118 facilitates communication between the actuator 114 and control circuitry on an externally mounted printed circuit board, PCB 120.

Figure 2:
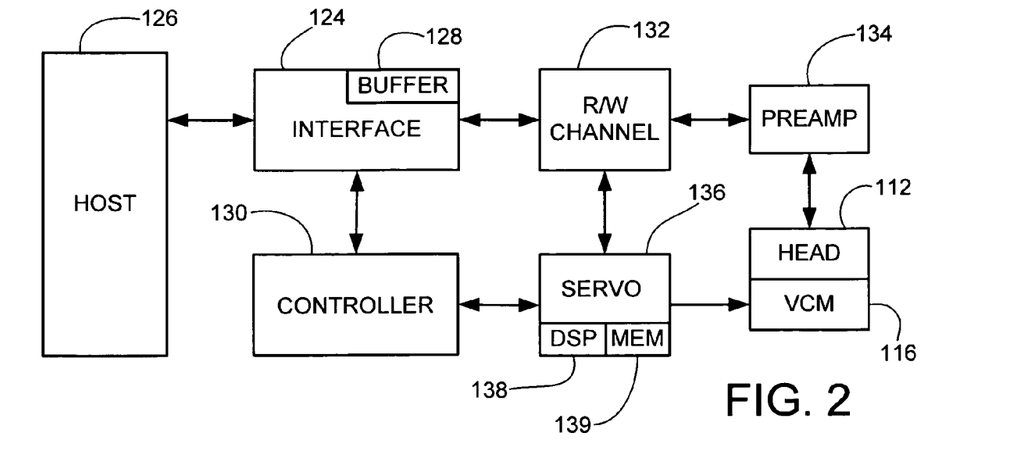
FIG. 2 is a generalized functional block diagram of the device of FIG. 1 in conjunction with a host.

As shown in FIG. 2, the control circuitry preferably includes an interface circuit 124 which communicates with a host device 126 using a suitable interface protocol (fibre channel, SAS, SCSI, etc.). The interface circuit 124 includes a buffer (cache memory) 128 for the temporary storage of data being transferred to or from the media 110. A controller 130 provides top level control for the device 100 and is preferably characterized as a programmable, general purpose processor with suitable programming to direct the operation of the device 100.

A read/write channel 132 encodes data to be written to the media 110 during a write operation and reconstructs transduced readback signals from the media 110 to reconstruct previously stored data during a read operation. A preamplifier/driver circuit (preamp) 134 provides head selection circuitry and conditions signals provided to and received from the heads 112.

A servo circuit 136 provides closed loop positional control for the heads 112. The servo circuit 136 preferably includes a digital signal processor (DSP) 138 which operates in accordance with associated programming and data in memory (MEM) 139 and in response to control inputs from the top level controller 130. A two processor system is preferred, but not required.

During a seek operation, the servo circuit 136 moves a selected head 112 from an initial track to a destination track on the associated media surface. Generally, the seek operation is not concluded until the head has successfully settled onto the destination track and the servo circuit is able to follow that track to allow the initiation of data access operations therewith.

It is desirable to carry out seeks in a minimum amount of time in order to maximize overall data throughput rates with the host 126. However, system resonances can adversely impact seek times, since the undesired excitation of such resonances during the movement of the actuator 114 can lengthen the settling time as the head 112 oscillates about the destination track.

Figure 3:
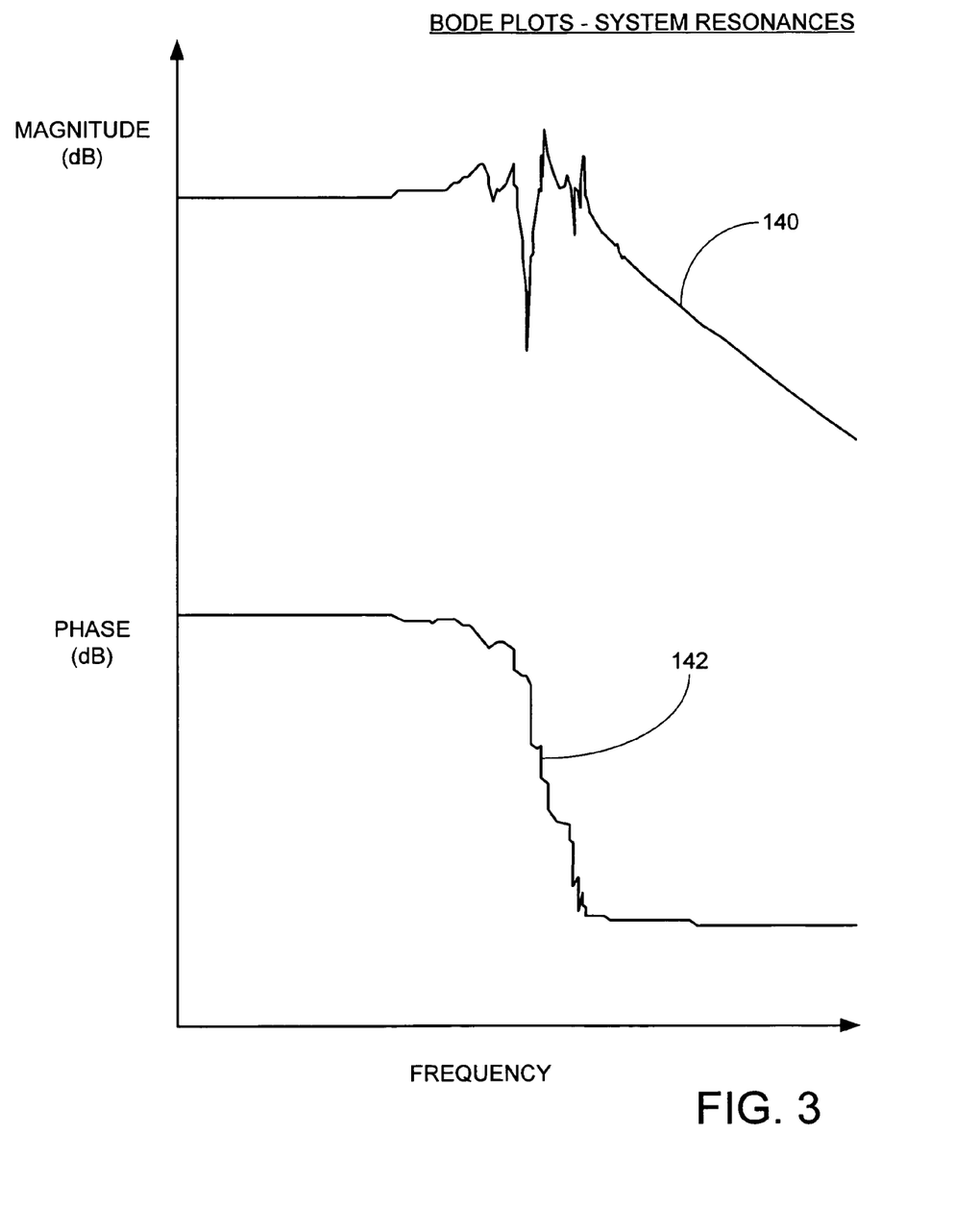
FIG. 3 provides magnitude and phase bode plot representations of system resonances of the device of FIG. 1.

FIG. 3 provides magnitude and phase bode plots 140, 142 of representative resonance responses of the device 100. System resonances can arise from a number of factors, including flexible modes of the actuator arms, bearing translation modes, disc flutter, and windage effects. These resonances are not easily modeled and can vary over time and under different environmental conditions.

Figure 4:
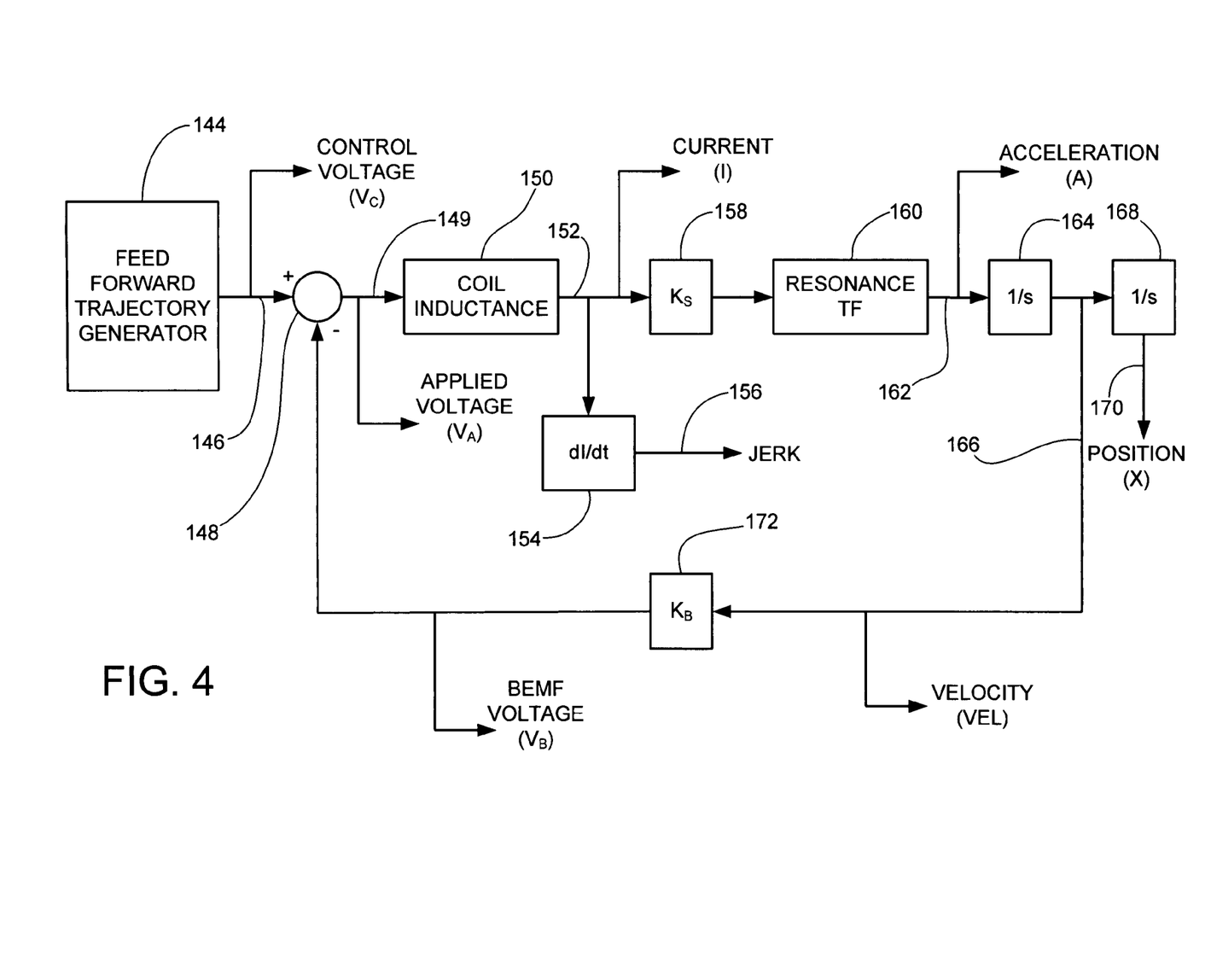
FIG. 4 is a functional block representation of relevant portions of a servo control circuit of the device constructed and operated in accordance with preferred embodiments to control the position of transducers of the device in view of the system resonances referenced in FIG. 3.

FIG. 4 provides a functional block representation of relevant portions of the servo control circuit 136. Portions of the circuitry of FIG. 4 are preferably embodied in programming executed by the DSP 138. While an applied voltage approach has been employed, this is merely for purposes of providing a concrete example and is not limiting.

A feed forward trajectory generator 144 derives and supplies control profiles to govern the execution of each seek. A control voltage ($V_C$) is supplied via path 146 to a summing junction 148. The output of the summing junction 148, applied voltage ($V_A$), is provided to the VCM 116 via path 149. Coil inductance of the VCM 116 is depicted at block 150, and provides a current (I) output on path 152. Derivation block 154 is used to take the derivative of current (dI/dt) to provide an indication of jerk (J) on path 156.

Block 158 represents system gain ($K_s$). A system resonance transfer function (TF) is denoted at block 160 to represent the effects of the resonances of FIG. 3. The output of block 160 is an acceleration (A) signal (path 162), which is integrated (1/s) by block 164 to provide velocity (VEL) on path 166.

Integrator 168 integrates velocity to provide an indication of position (X) on path 170. A back electromotive force (bemf) gain block ($K_B$) 172 scales the velocity for input back to the summing junction 148. The feed forward trajectory generator utilizes the various outputs of the circuitry (position, velocity, etc.) to adjust the operation of the circuit to bring the head 112 to the destination track, depending upon the control mode (velocity control, position control, model reference, etc.).

It can be seen at this point that if the feed forward trajectory generator 144 were to utilize a time-optimal control voltage profile (e.g., square wave pulses to accelerate and then decelerate the head 112), the associated large changes in jerk would cause significant excitation of the system resonances (block 160). This was confirmed by computer simulations which found that overall seek time for a particular seek increased from an ideal seek time of about 3 milliseconds, ms to around 25 ms due to excessive oscillation during settling.

Accordingly, preferred embodiments of the present invention generally operate to provide a near time-optimal solution. A near time-optimal solution is defined herein as a feed-forward trajectory that can be shown to be comparable to the performance of a time-optimal solution for a simpler ideal model, and that incorporates some method of vibration minimization or disturbance rejection for phenomena that cannot be adequately modeled.

Figure 5:
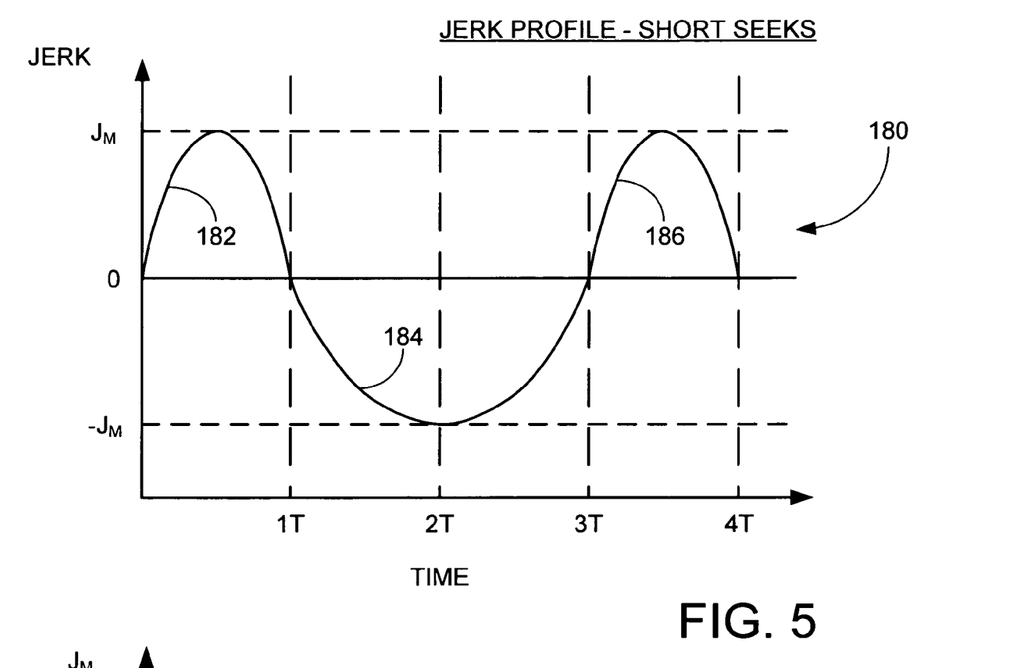
FIG. 5 provides a graphical representation of a segmented, three pulse jerk profile for short seeks by the device.

A short seek jerk trajectory is first set forth by a jerk profile 180 in FIG. 5. This trajectory satisfies a position constraint such that constraints on a maximum allowable velocity and a maximum allowable control voltage are not met during the seek. The trajectory further ends the seek with zero velocity and zero acceleration or current.

As shown in FIG. 5, the profile 180 is a segmented, three pulse jerk profile with first, second and third pulses 182, 184, 186. The pulses are preferably sinusoids as a function of time T. The first and third pulses 182, 186 are of a first polarity (e.g., positive) and the second pulse 184 is of opposite polarity (e.g., negative). As those skilled in the art will recognize, the respective polarities depend on the direction of travel of the control object.

All three pulses 182, 184, 186 have the same absolute maximum magnitude (a maximum jerk, $J_M$), and the combined pulse widths of the first and third pulses 182, 186 (each 1T) are set equal to the pulse width of the second pulse 184 (2T). Thus, the combined areas of the first and third pulses are equal to the second pulse, which satisfies the ending requirement of zero velocity and acceleration/current. Limiting the profile to three pulses (as opposed to incorporating additional pulses) has been found to advantageously limit excitation of the system resonances.

The short seek profile 180 of FIG. 5 thus has a baseline seek time of 4T, which can be adapted for individual seek lengths. Optimization for different seek lengths can be carried out using well known numerical methods, such as optimization routines from Matlab® software, The Mathworks, Inc., Natick, Mass., USA.

The pulses 182, 184, 186 are preferably first order sine function segments, although other curvilinear waveforms can be utilized as well including modified 1-cosine functions to provide improved transition between segments. An advantage of using a sinusoid based waveform is a reduction in the excitation of the system resonances.

This advantage is further realized through the use of substantially symmetric pulses, as shown in FIG. 5. That is, each of the first, second, and third pulses 182, 184, 186 can be seen to comprise a leading portion that approaches a maximum value of the pulse ($J_M$ or $-J_M$) and a trailing portion that extends away from the maximum value of the pulse. In each case, the leading portion is nominally identical to the trailing portion so that the pulses are nominally symmetric about the associated maximum value.

The individual values from the profile 180 can be calculated on the fly, but are preferably stored as a discrete series of baseline values in a table. A dedicated table can be established in DSP memory 139 (FIG. 2) to provide all of the values set forth in FIG. 5 (from 0 to 4T). Alternatively, a utility sine table such as accessible to both controller 130 and DSP 138 can be accessed and segmented to provide the 0 to 1T, 1T to 3T and 3T to 4T pulses.

It will be noted that the profile 180 of FIG. 5 is generally only a function of one variable, the maximum allowable value of jerk ($J_M$). This value can be selected analytically, such as through finite element modeling of the actuator, or empirically, such as shown by FIG. 6.

Figure 6:
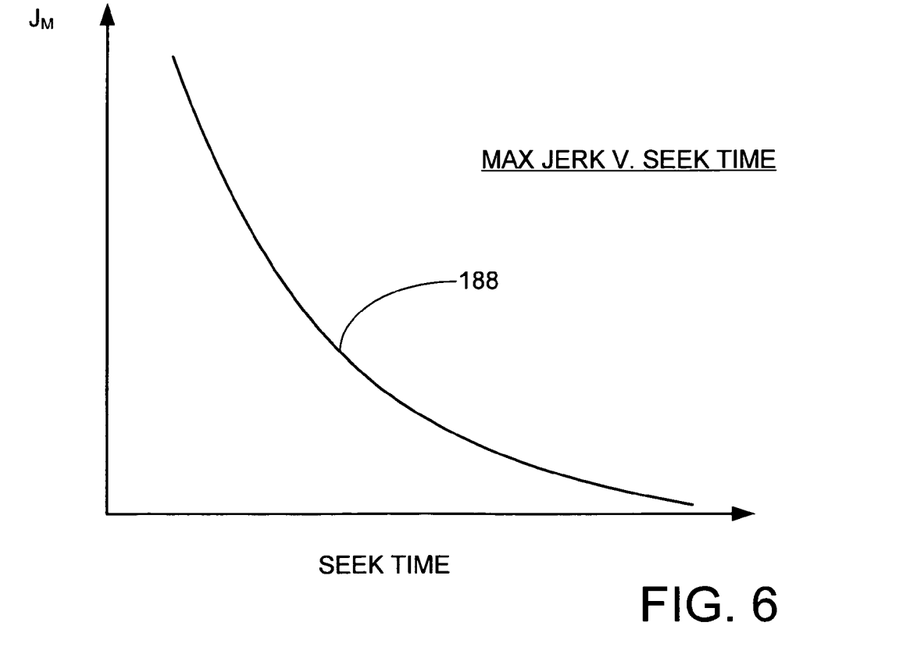
FIG. 6 denotes the relationship between maximum jerk magnitude and seek time.

FIG. 6 provides a maximum jerk versus seek time curve 188, which generally illustrates that within controllable ranges, higher values of $J_M$ generally provides shorter seek times (for a given seek length), but the rate of return varies. It was found in one example that an increase in $J_M$ from 2,000 in/s$^3$ to 4,000 in/s$^3$ resulted in a seek time decrease of 1.75 ms, but an increase in $J_M$ from 8,000 in/s$^3$ to 10,000 in/s$^3$ resulted in a seek time decrease of less than 0.5 ms.

By selecting appropriate weighting factors on seek time and maximum allowable jerk, a relationship such as curve 188 can be utilized to self-tune a maximum allowable jerk value.

Figure 7:
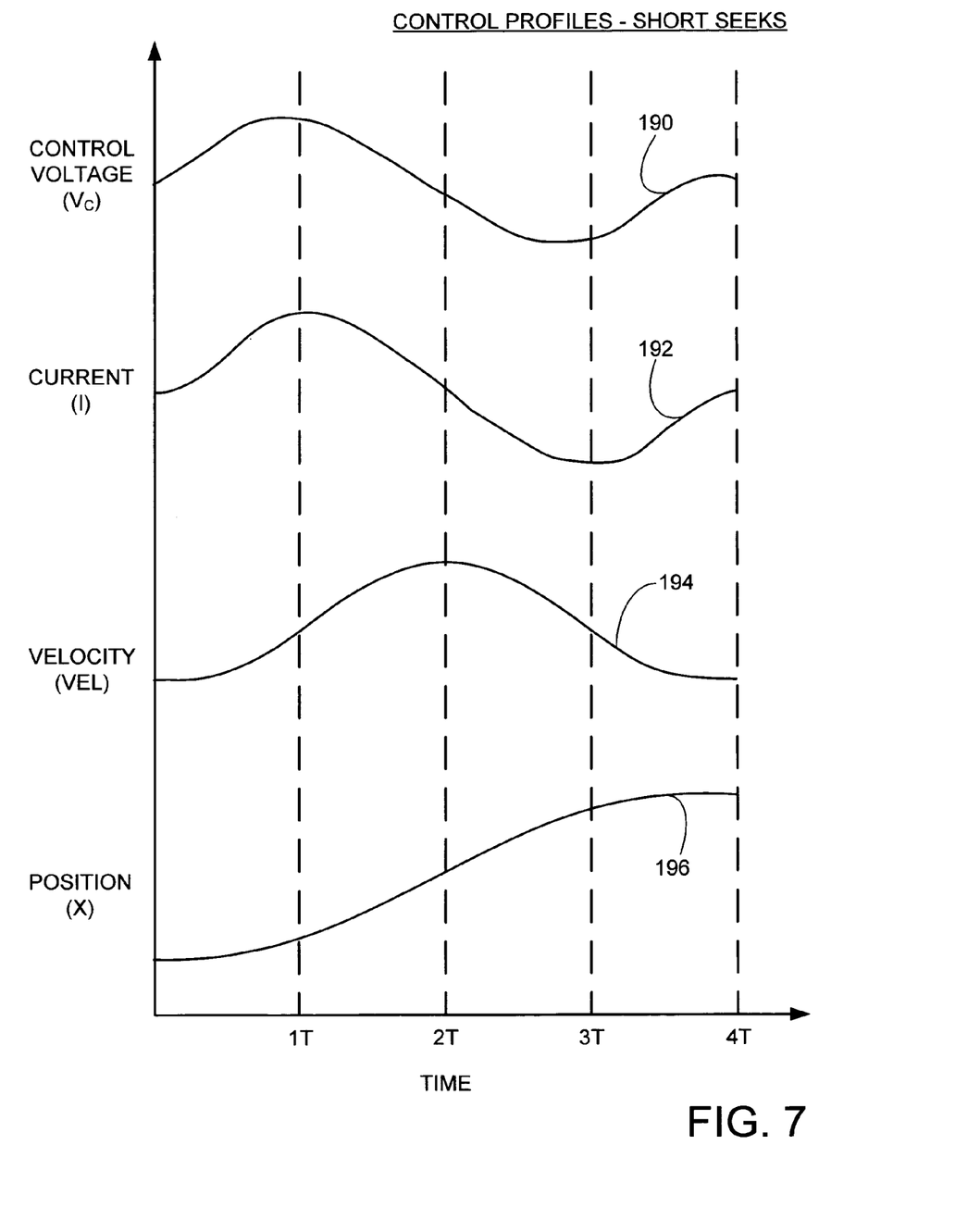
FIG. 7 sets forth a family of control profiles derived from the short seek jerk profile of FIG. 5.

The short seek jerk profile 180 is used to generate other control profiles such as exemplified in FIG. 7, including control voltage profile 190, current profile 192, velocity profile 194 and position (displacement) profile 196. As will be recognized, integrating jerk provides current, integrating current provides velocity, and integrating velocity provides position. Referring again to FIG. 4, the relationship between control voltage $V_C$ and current I can be set forth as:

$$V_A = V_C - V_B \quad (1)$$

$$V_C = V_A + V_B = L(dI/dt) + I(R) + V_B = L(J) + I(R) + K_B(VEL)$$

where L is the inductance of the coil, R is the resistance of the coil. Preferably, the requisite control profiles are generated by the feed forward trajectory generator 144 from the short seek jerk profile 180 for each seek, and scaled to the appropriate seek length. This has been found to be an advantageous solution since the profile is preferably a function of only one variable (max jerk $J_M$), allowing the requisite calculations to be generated in a resource efficient manner. Empirical analysis has shown that the resulting profile 180 provides seek times that are comparable to ideal time-optimal seeks and that significant excitations of system resonances are avoided, so that the profile meets the near time-optimal formulation set forth above.

As mentioned previously, the short seek profile 180 meets constraints on maximum velocity and maximum control voltage. The maximum velocity constraint is a design criterion that specifies the maximum allowable velocity of the head 112 to prevent damage to the device 100 in the event of a run-away condition in which the actuator slams at full speed into an end-of-stroke limit stop. The maximum control voltage represents saturation of the power amplifier that supplies voltage and current to the coil.

Figure 8:
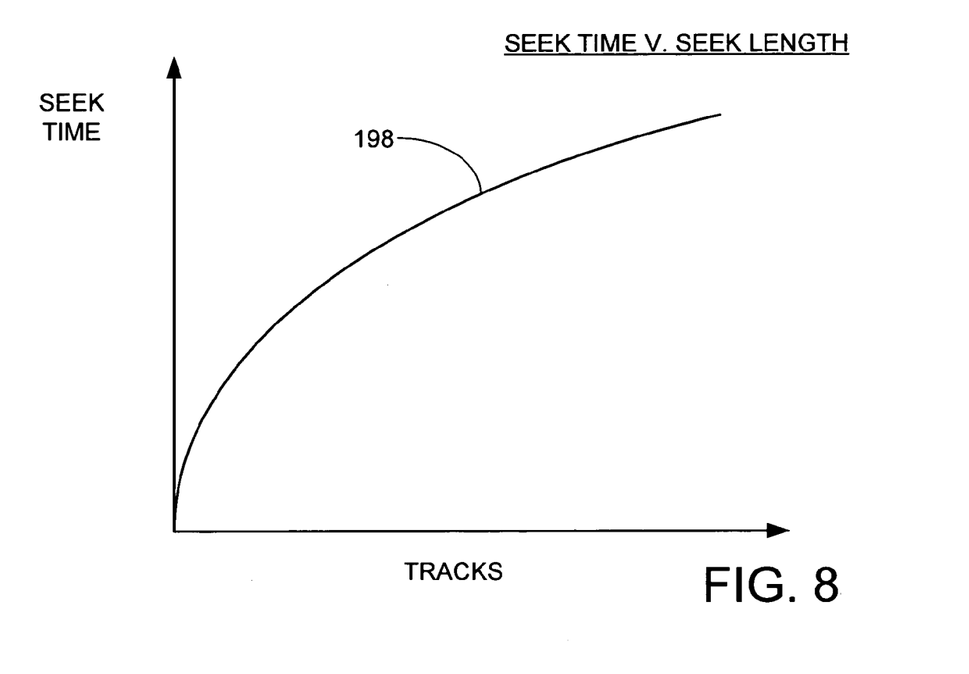
FIG. 8 illustrates the relationship between seek time and seek length using the jerk profile of FIG. 5.

The maximum seek length that can be carried out using the short seek profile 180 is thus that length of seek at which the first of these criteria is met. FIG. 8 provides a curve 198 that illustrates seek time v. seek length results for a selected value of $J_M$. Empirically it was determined in one example that short seeks could be extended to 14,429.25 tracks before the control voltage constraint was violated (the velocity constraint was never violated over this interval).

It is contemplated that short seeks constitute the majority of seek access events during normal operation of data storage devices such as 100. Thus, in some preferred embodiments a profile such as 180 is utilized to control shorter seeks, and longer seeks are carried out using conventional velocity control or other methodologies.

Alternatively, a long seek jerk trajectory can be utilized based on the short seek profile 180 of FIG. 5. This long seek trajectory should satisfy a position constraint such that the constraints on the maximum allowable velocity and maximum allowable control voltage are met for as long as possible, but not violated. Because the control voltage will be maintained near, but not surpassing saturation, the pulses from the profile 180 should not be widened.

Figure 9:
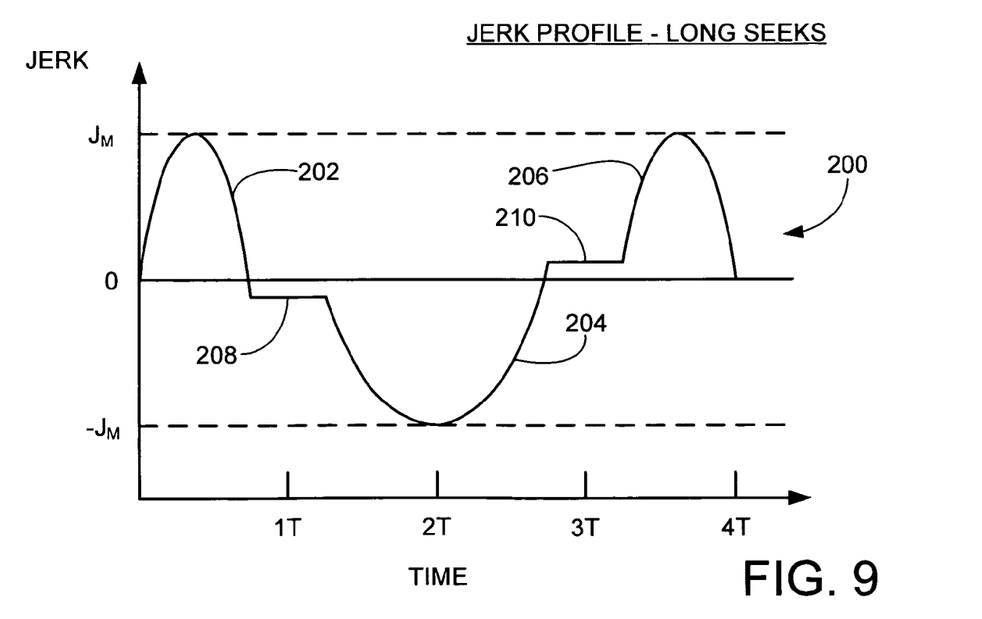
FIG. 9 provides a graphical representation of a segmented, three pulse jerk profile for long seeks by the device.

Accordingly, a long seek jerk profile 200 is set forth by FIG. 9. The overall time scale remains at 4T, but it will be understood that first, second and third pulses 202, 204, 206 are nominally identical to the pulses 182, 184, 186 in FIG. 5.

Equal and opposite constant jerk segments 208, 210 are respectively inserted between the first and second pulses 202, 204 and between the second and third pulses 204, 206 as shown. These constant jerk segments 208, 210 are preferably non-zero to account for the effects of bemf voltage ($V_B$), and to enhance control effort.

Those skilled in the art can empirically select appropriate levels for the segments 208, 210; in one example the magnitudes of these segments 208, 210 was set at ±212.5 in/s$^3$ based on an optimization analysis. It will be noted that using equal and opposite segments further maintains the "balance" of the area above the zero line with the area below the zero line in the profile, maintaining the end seek constraints of zero velocity and zero current/acceleration. The lengths of the segments 208, 210 are not fixed, but rather extended or contracted as required in relation to the length of the long seek.

Figure 10:
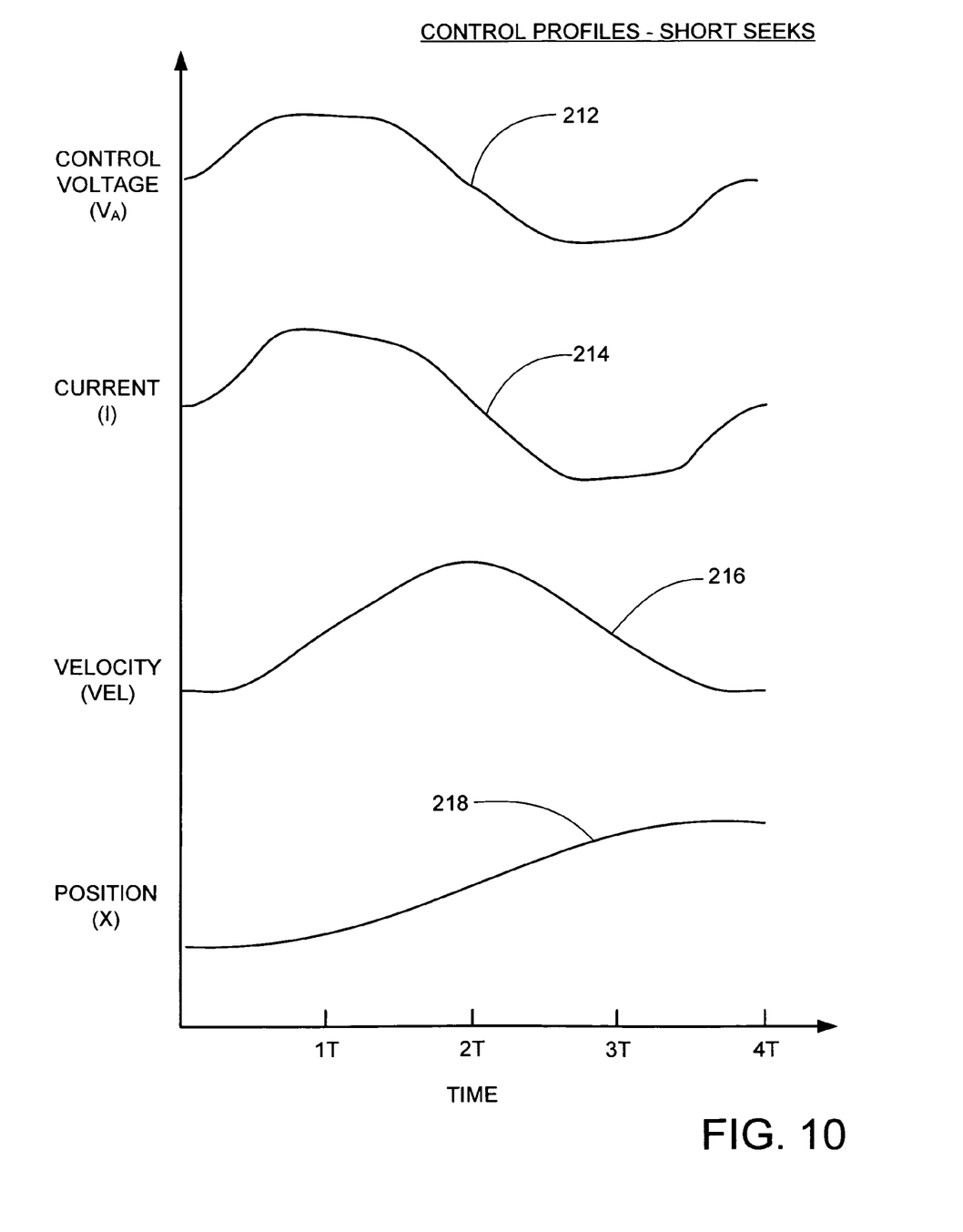
FIG. 10 sets forth a family of control profiles derived from the long seek jerk profile of FIG. 9.

Associated control profiles from the long seek profile 200 are exemplified in FIG. 10 to include control voltage profile 212, current profile 214, velocity profile 216 and position (displacement) profile 218. These profiles are utilized as desired to carry out a long seek; for example, a velocity control approach may be performed whereby the control object (head 112) is caused to follow the velocity trajectory of profile 216.

As before, empirical studies have shown that the long seek profile 200 provides seek times that are comparable to the ideal time-optimal solution discussed above, with significant disturbance rejection as compared to the time-optimal solution.

A small amount of localized shaping (e.g., radiusing) can be applied to the respective ends of the segments 208, 210 as desired to smooth out the abrupt "corners" in FIG. 9, thereby further reducing the prevalence of abrupt changes in jerk that might excite the system resonances during long seeks. Such shaping still maintains balance of the profile and is preferably restricted to a relatively few sample points at the ends of the constant-jerk segments 208, 210.

Figure 11:
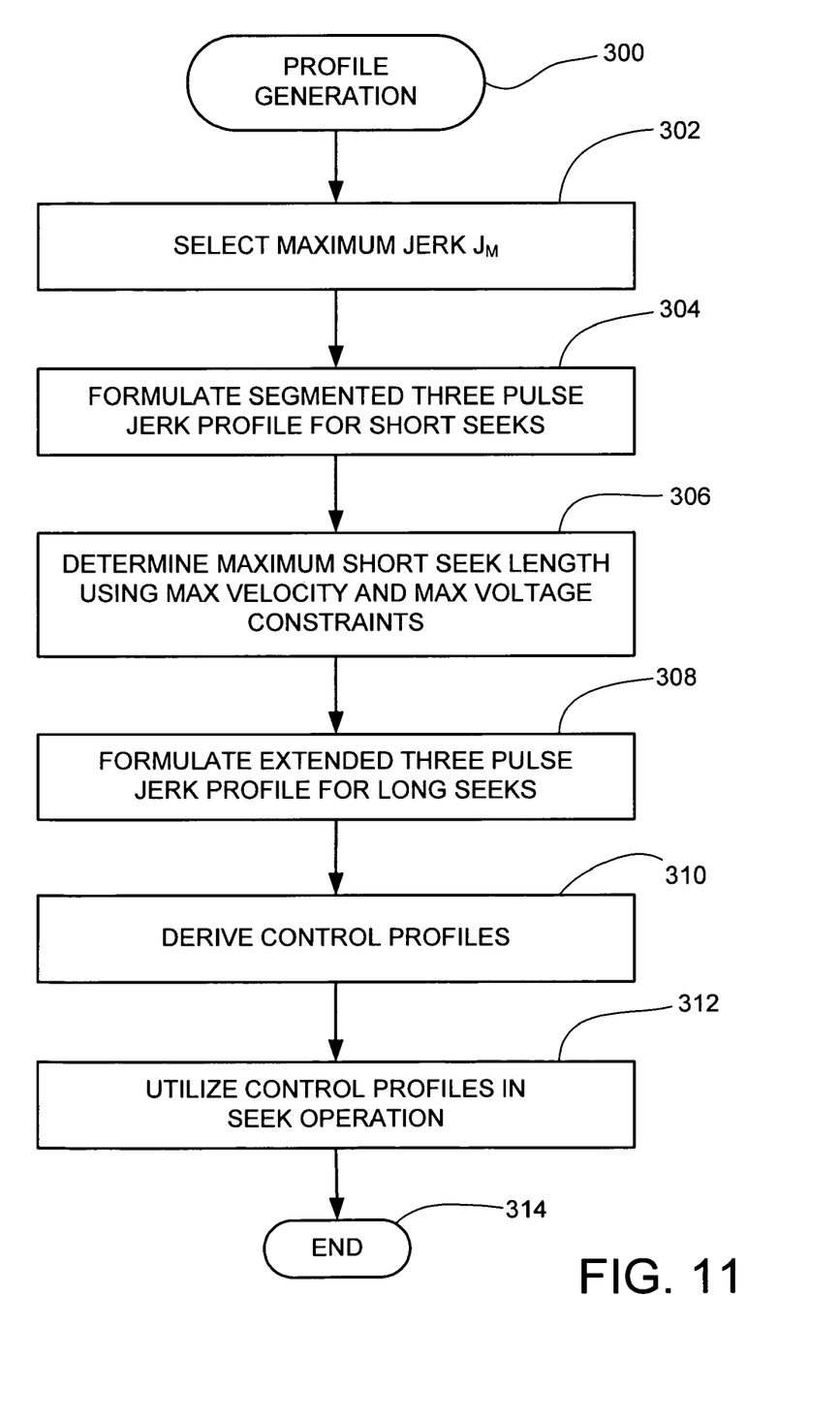
FIG. 11 is a flow chart for a PROFILE GENERATION routine, illustrative of steps carried out in accordance with preferred embodiments of the present invention.

FIG. 11 sets forth a flow chart for a PROFILE GENERATION routine 300 to summarize steps preferably carried out in accordance with preferred embodiments of the present invention for a data storage device such as 100 or other control system.

A maximum allowable jerk value $J_M$ is identified at step 302 using analytical or empirical techniques, as discussed above. Next, a segmented, three pulse jerk profile is formulated such as exemplified by profile 180 in FIG. 5, with the profile pulses preferably characterized as sinusoids at the maximum jerk $J_M$ and balanced pulse widths to satisfy the end seek constraints.

At step 306, the maximum short seek length is determined by extending seek lengths until at least one of a maximum velocity and a maximum voltage constraint are met. A long seek jerk profile is next formulated at step 308 by utilizing equal and opposite, non-zero constant jerk segments between the pulses as set forth by the profile 200 in FIG. 9. As desired, shaping (radiusing) of the ends of the constant jerk segments is applied as discussed previously.

Associated control profiles are next preferably derived from the respective base jerk profiles 180, 200 at step 310, as shown in FIGS. 7 and 10. The control profiles are thereafter utilized to carry out seek operations to move the control object from a first position to a final position at step 312, and the routine ends at step 314.

For purposes of the appended claims, the phrase "time-optimal" will be defined consistent with the foregoing discussion as a trajectory that provides seek times comparable to an ideal time-optimal (bang-bang) solution and that includes a characteristic to reduce excitation of system resonances. The recited "area" of a pulse will be defined as that area bounded by the pulse and a mid-line extending between the maximum value of the pulse and the maximum value of another pulse in the sequence of opposite polarity (such as the mid-line "0" in FIGS. 5 and 9). The term "sinusoidal" will be defined broadly to include waveforms that substantially resemble first order sinusoidal pulses, and includes, but is not limited to, first order sinusoids, modified 1-cosine sinusoids, multi-order curvilinear (parabolic) functions, etc.

The recited "first means" will be understood to correspond to the disclosed DSP 138 with associated DSP memory 139, which operates to set forth the circuitry of FIG. 4 in accordance with one or both of the respective three-pulse jerk profiles 150, 200 of FIGS. 5 and 9. Jerk profiles with more than three pulses, and jerk profiles with pulses that are not nominally symmetric (both in total about the mid-line and individually about the pulse maximum magnitudes) are excluded from the definition of an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular control environment without departing from the spirit and scope of the present invention.

In addition, although the embodiments described herein are directed to a data storage device that employs a closed loop servo control circuit to move a transducer adjacent a data storage medium, it will be appreciated by those skilled in the art that the claimed subject matter is not so limited and various other control object positioning systems, including any number of automated robotic actuator or positioning systems that employ rotational, linear or multi-axis motion, can be utilized without departing from the spirit and scope of the claimed invention.

What is claimed is:

1. A method comprising a step of moving a control object from an initial position to a final position using a near time-optimal jerk control profile comprising a sequence of first, second and third sinusoidal pulses of respectively alternating polarity and common absolute magnitude, the area of the second pulse selected to be nominally equal to the combined area of the first and third pulses, wherein each of the first, second, and third pulses comprises a leading portion that approaches a maximum value of the pulse and a trailing portion that extends away from the maximum value of the pulse, and wherein the leading portion is nominally identical to the tailing portion so that each said pulse is nominally symmetric about said maximum value, and wherein the jerk control profile further comprises a first constant, non-zero jerk segment between the first and second pulses and a second constant, non-zero jerk segment between the second and third pulses.

2. The method of claim 1, wherein each of the first, second, and third pulses comprises a sine function.

3. The method of claim 1, further comprising a step of deriving at least a selected one of a control voltage profile, a current profile, a velocity profile and a displacement profile to describe an associated characteristic trajectory for the control object from the jerk control profile.

4. The method of claim 3, further comprising a step of utilizing the at least a selected one of said control voltage profile, current profile, velocity profile and displacement profile to move the control object from the initial position to the final position.

5. The method of claim 1, wherein each of the first, second, and third pulses comprises a cosine function.

6. The method of claim 1, wherein the first and second constant, non-zero jerk segments each share a common absolute magnitude.

7. The method of claim 1, wherein the control object comprises a transducer in a data storage device and wherein the method further comprises storing the jerk control profile in a memory location of said device.

8. A method comprising a step of moving a control object from an initial position to a final position in accordance with a jerk control profile that describes a near time-optimal jerk trajectory for the control object, the jerk control profile comprising a first sinusoidal pulse of first polarity, a second sinusoidal pulse of second polarity opposite the first polarity and a third sinusoidal pulse of first polarity, wherein the second sinusoidal pulse comprises an area equal to a combined area of the first and third sinusoidal pulses, and wherein the jerk control profile further comprises a first constant, non-zero jerk segment between the first and second pulses and a second constant, non-zero jerk segment between the second and third pulses.

9. The method of claim 8, wherein each of the first, second and third pulses peak at a common maximum absolute magnitude, wherein each of the first, second and third pulses has a leading portion that approaches said absolute magnitude and a trailing portion that extends away from said absolute magnitude, and wherein the first and second portion are substantially symmetric with respect to said absolute magnitude.

10. The method of claim 8, further comprising a step of deriving at least a selected one of a control voltage profile, a current profile, a velocity profile and a displacement profile to describe an associated characteristic trajectory for the control object from the jerk control profile.

11. The method of claim 10, wherein the moving step comprises utilizing the at least a selected one of said control voltage profile, current profile, velocity profile and displacement profile to move the control object from the initial position to the final position.

12. The method of claim 8, further comprising steps of selecting a maximum jerk value and setting the respective maximum magnitudes of the first, second and third pulses equal to said maximum jerk value.

13. The method of claim 8, wherein each of the first, second, and third pulses comprises at least a selected one of a sine or a cosine function.

14. The method of claim 8, wherein the first and second constant, non-zero jerk segments each share a common absolute magnitude.

15. An apparatus comprising a control object and first means for moving the control object from an initial position to a final position using a jerk control profile comprising a sequence of first, second and third sinusoidal pulses of respectively alternating polarity and common absolute magnitude, the area of the second pulse selected to be nominally equal to the combined area of the first and third pulses, the jerk control profile further comprising a constant non-zero jerk segment between the first and second sinusoidal pulses.

16. The apparatus of claim 15, wherein the first means comprises a feed-forward trajectory generator.

17. The apparatus of claim 16, wherein the first means further comprises a memory in which the jerk control profile is stored.

18. The apparatus of claim 15, wherein the control object comprises a transducer in a data storage device.

* * * * *